(12) United States Patent
Russin (10) Patent No.: US 6,591,010 B1
(45) Date of Patent: Jul. 8, 2003

(54) SYSTEM AND METHOD FOR IMAGE DETECTION AND QUALIFICATION

(75) Inventor: Robert Michael Russin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,946

(22) Filed: Jul. 29, 1999

(51) Int. Cl.[7] .............................. G06K 9/64; G06K 9/20; H04N 11/20

(52) U.S. Cl. ...................... 382/209; 382/217; 382/278; 382/282; 348/450; 358/538; 358/520; 358/450

(58) Field of Search ................................. 382/164, 165, 382/170, 209, 214, 217, 218, 219, 220, 221, 236, 278, 224, 282, 284, 286, 287, 294; 358/538, 518, 519, 520, 521, 523; 348/450, 453

(56) References Cited

U.S. PATENT DOCUMENTS

| | | | | |
|---|---|---|---|---|
| 5,208,903 A | * | 5/1993 | Curry .......................... | 345/594 |
| 5,375,210 A | | 12/1994 | Monnes et al. | |
| 5,526,058 A | * | 6/1996 | Sano et al. .................. | 348/647 |
| 5,682,529 A | | 10/1997 | Hendry et al. | |
| 5,802,361 A | * | 9/1998 | Wang et al. ................. | 395/600 |
| 5,805,733 A | * | 9/1998 | Wang et al. ................. | 382/232 |
| 5,850,473 A | * | 12/1998 | Andreson .................... | 382/165 |
| 5,883,973 A | * | 3/1999 | Pascovici et al. ........... | 382/176 |

* cited by examiner

Primary Examiner—Jayanti K. Patel
Assistant Examiner—Yosef Kassa
(74) Attorney, Agent, or Firm—Robert H. Frantz; David A. Mima, Jr.

(57) ABSTRACT

A method and a system employing the method is disclosed for detecting and qualifying a portion of a digital image stored in a computer-readable memory with respect to a reference digital image. The method and system accesses video memory of a video controller device, retrieves a portion of the rasterized image, and compares the portion of the image on a pixel-by-pixel basis for approximate match to the reference image. Because graphics accelerators in video controller devices render inexact graphic images which are nonetheless visually acceptable, the method and system further employs a step of comparison for a match on a pixel region basis. A method of comparison wherein the reference pixel and the pixel or pixels under analysis is disclosed which plots the pixels in three-dimensional space defined by the color palette variables, allowing a pixel to "match" the reference pixel if it's position within the three-dimensional color space is within a certain radius of the reference pixel's position.

14 Claims, 5 Drawing Sheets

*Prior Art*

Figure 4a $$D_\Delta = \sqrt{R_\Delta^2 + G_\Delta^2 + B_\Delta^2} = \sqrt{(R_t - R_r)^2 + (G_t - G_r)^2 + (B_t - B_r)^2}$$

SYSTEM AND METHOD FOR IMAGE DETECTION AND QUALIFICATION

FEDERALLY SPONSORED RESEARCH AND DEVELOPMENT STATEMENT

This invention was not developed in conjunction with any Federally sponsored contract.

TECHNICAL FIELD OF THE INVENTION

This invention pertains to the arts of image detection and qualification in digital imaging and computer systems. In particular, this invention relates the arts of computer video driver hardware and firmware testing and qualification.

CROSS-REFERENCE TO RELATED APPLICATIONS (Claiming Benefit Under 35 U.S.C. 120)

None.

MICROFICHE APPENDIX

Not applicable.

BACKGROUND OF THE INVENTION

1. Field of the Invention

This invention relates to the arts of image detection, recognition, and qualification especially as applied to rasterized images such as those produced by computer displays and digital televisions. The invention is applicable to a range of workflow automation tasks in the field of computer video hardware and software testing, as well as possible applications involving the detection of images in video and digital still photographs for fields such as medical imaging, security, handwriting recognition and verification, and optical character recognition.

2. Description of the Related Art

Digital images are prevalent throughout everyday life, including the digital images displayed on computer screens, digital television broadcasts, digital still photography, document scanners, and even facsimile machines employ a form of digital imaging. In its simplest form, digital imaging is the process of converting an "analog" image, which consists of continuous features such as lines and areas of color, to a digitized encoding which represents the analog image. Typically, a scanning technique is used to create a rasterized image comprising rows and columns of pixels. Each pixel represents just one "dot" in the total image, and when viewed separately may not convey useful visual information to the human eye. However, when the entire field of pixels are viewed at an appropriate distance, a human observer can recognize the image as being that which was originally represented by the analog image.

Monochrome imaging simply uses pixels within a binary color palette, such as black and white. In monochrome imaging, the digital representation of an analog image typically consists of data values which represent an "on" or "off" value for each pixel in the image. When the image is displayed on a computer terminal or printed on paper, the "on" pixels may be represented by "white" dots, and the "off" pixels may be represented by "black" dots. In a reverse video mode, the colors are swapped in the palette yielding an output which resembles an analog negative of the original analog image.

Color digital imaging techniques also typically employs a rasterized or "pixelated" conversion from the analog image to a digital data set. In order to digitize the color value of each pixel, a color imaging device such as a scanner or digital camera will separate the image into 3 monochrome colors, most commonly red, blue and green. For each pixel, a color strength, or luminance, value is recorded for each of the primary separation colors. Thus, each pixel in the image is represented by a raster position, such as row and column values, and a set of red, green and blue ("RGB") color strengths. When the image is to be output to a computer terminal, the three color guns of the cathode ray tube ("CRT") are modulated to increase or decrease the strength of the dot produced in each color at each pixel location on the viewing screen. The result is an analog mixing of the three colors to provide a similar shade of color when viewed by the human eye. The overall image is interpreted by the viewing of the entire field of pixels as in monochrome image viewing. Other types of output technology use similar techniques to produce an analog mixing of the three output colors. For example, laptop computer displays typically use liquid crystal displays ("LCD") which employ three colors of dots located very close together to represent a single pixel. The human eye does not see the individual color dots, but tends to see the larger pixel as a sum or mix of the three color dots. The driver hardware and firmware for the LCD panel will modulate each color dot in time to cause more or less energy of each color to be emitted over time, relying on the relatively slow response of the human retina to integrate or sum the energies in to what appears to be a shade of color. Digital printers such as ink jet printers and color laser printers use similar techniques by printing more or less ink in small dots very near each other for each pixel on paper, plastic, or some other printable media.

Computers are a special type of digital imaging system in which many of the images output or displayed are digitized analog images, such as photographs or movies, and many of the images are generated purely in the digital domain. The simplest example of such a purely digital image is a computer word processor which creates the image of a type written page or document without need to actually scan a real analog typewritten page. More advanced computer-generated images include computer graphics, animated images, and images produced as the result of mathematical operations on data representing non-visual information such as thermal imaging or X-ray scans.

Figure 1:
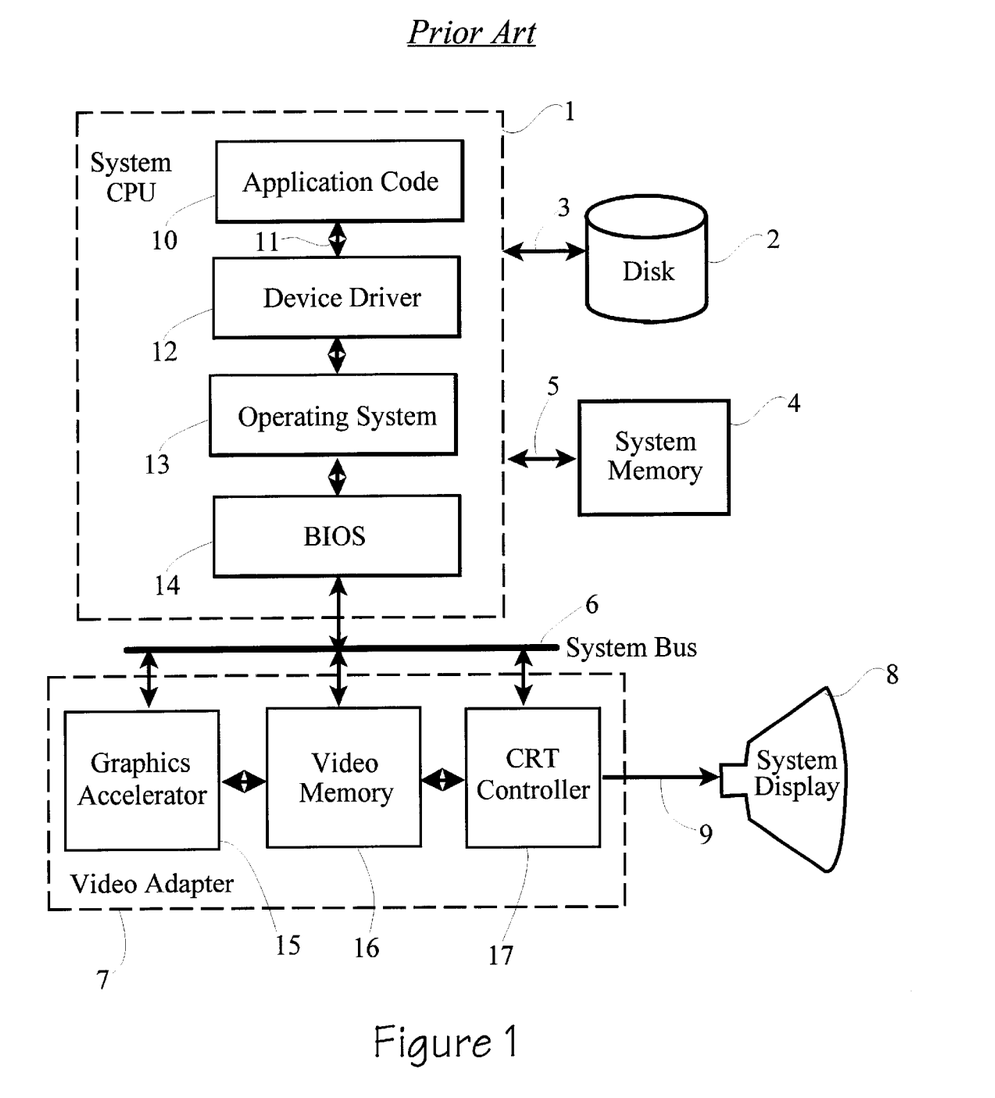
FIG. 1 discloses a generic computer system architecture well-known within the art and applicable to many existing computer hardware platforms and software structures.

FIG. 1 shows a common architecture used within computers to generate digital images. The system central processing unit ("CPU") (1) is provided with a persistent data storage, such as a disk drive (2), and a disk drive interface (3) through which the CPU (1) can store and retrieve program code and data. The disk drive (2) may be of many types well known within the art, such as floppy disk, "Winchester" hard drives or CD-ROM (compact disk read only memory). The disk drive interface may also be of many types well known within the art, such as IDE or SCSI.

The CPU is also provided with volatile system memory (4) such as random access memory (RAM), and a system memory interface (5) through which the CPU can store and retrieve program code and data. The system memory interface (5) is typically a local bus with very low latency and access times which increases the CPU's operational capabilities or "processing bandwidth".

The CPU (1) can retrieve program code for execution from the disk drive (2) or the system memory (4). Program code is commonly organized into several types of code. A set of basic input/output functions (14), or BIOS, allows the lowest level of access between the software on the CPU and the system hardware. BIOS function calls usually include operations such as read or set the system clock or read or write to a hardware peripheral. An operating system (13) ("OS") such as IBM OS/2 usually executes above the BIOS, and provides system resource management, such as multi-tasking and memory management functions. A set of device drivers (12) is also typically provided, which are modules of program code specific to hardware peripherals such as system add-in cards. Finally, the application code (10) interfaces to the device drivers (12) and OS (13) through an application program interface ("API") (11) to access system resources, such as the disk drive (2), system memory (4) and the system display (8).

The CPU (1) is also typically provided with an expansion system bus (6) which allows the addition of system peripherals as required by specific applications of the system. The system bus (6) may be one of many well-known computer busses such as peripheral component interconnect ("PCI"), micro-channel architecture bus ("MCA"), or industry standard architecture bus ("ISA"), but may also be a proprietary bus. One common system peripheral is a video adapter card (7), which allows the system to be configured for various display device types, such as VGA CRT's or LCD monitors, by the addition of a video adapter card which supports the specific display device (8) to be used.

In order to enhance the performance of the overall system, most video adapter cards (7) employ an on-board graphics accelerator (15), local video memory (16), and display control circuitry (17). In this arrangement, the CPU (1) is not required to calculate every individual pixel's values for red, green and blue intensity, but rather can simply command the graphics accelerator to do the same. For example, the CPU (1) may command the graphics accelerator (15) via the system bus (6) to generate a circle of 50 pixels in diameter having a color of magenta. The graphics accelerator (15) then calculates the proper RGB values for each pixel on the display, and stores those data values in the local video memory (16). The display control circuitry (17) periodically reads the contents of the video memory (16), and modulates the signals to the system display (8) appropriately to create the pixels on the viewing screen.

The CPU may also directly access the video memory (16) via the system bus (6) in order to cause images which are already in a rasterized form to be displayed. This is necessary when the CPU needs to display scanned photographs or digitized movies, for example. In such a case, the CPU may store the RGB data for the image directly into the appropriate areas of video memory (16).

In most systems, the CPU can also read the video memory (16) contents and store those in system memory (4) or to the disk drive (2), for later retrieval and/or operation. This is common for operations such as "print screen".

During the configuration or manufacture of computer systems, video adapter cards from various manufacturers and display devices from various manufacturers may be easily incorporated and exchanged for similar models with similar specifications. However, because the algorithms employed in different graphics accelerators are not identical, their results to commands from the system CPU vary. As a computer manufacturer incorporates a different video adapter card into a computer system, the performance of the new video adapter card is typically verified by using test software to display test patterns on the system display. A human operator is then required to view the test patterns and to qualify them as acceptable or not acceptable based on clarity, color correctness, and overall image quality. As these are subjective values, the manufacturer will experience varying test results based on different test operators. The process is also very time consuming and adds to the manufacturing cost of the system. Therefore, there exists a need in the art for a system and method which can automate this process of validation of the image produced by the video adapter card in response to a set of commands by the CPU to display "reference" images.

Additionally, there are instances in the arts of imaging, such as medical imaging, when digitized images are displayed for a human operator to review thoroughly looking for particular patterns. For example, a digital image of a sonogram or CTI scan may be displayed for minutes to hours while a trained human operator looks for a pattern in the image, such as a bone break, a bullet, or the location of a catheter. If the computer system were provided with reference images of such features to be found, the computer could also search the image to assist the human operator in finding possible instances of the feature, thereby reducing the time to detect the feature and reducing the number of features missed.

Therefore, there exists a need in the art for a system and method which automates the detection and qualification of image features within rasterized or digital images based on known reference features to be found. There further exists a need in the art for this system and method to employ standard system architecture methods and features so as to be useful and applicable across many computer hardware platforms, operating systems, and imaging devices and technologies.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The system and method disclosed herein first performs a direct pixel-to-pixel comparison between the reference image and the image under analysis. Variations of color implementation in the image under analysis are allowed. If the direct pixel-to-pixel analysis does not yield a match for a particular pixel, a regional comparison of adjacent pixels is made to allow for variations on graphics representation. If enough matches are not found within the allowed region of pixels, the image is declared as not properly represented. Otherwise, in order for an image to be declared an accurate representation of the reference image, all pixels must have either a direct match or a regional match.

To enhance the usefulness of the method disclosed, the amount of allowable color variation and the size of the regional comparison is adjustable. To enable the system and method to be employed on an wide array of computer hardware platforms and operating systems, the system and method is implemented as an application program which accesses the video memory buffers of the video adapter.

DETAILED DESCRIPTION

The invention is preferably embodied as software application program code executed on a standard computing platform, such as an IBM-compatible personal computer running the IBM OS/2 operating system. Other computing platforms and operating systems may be employed alternatively. The preferred video adapter card is any card which conforms to VGA or SVGA video standards, and preferably compatible with PCI. However, other video interface adapters on alternative busses may be used. FIG. 1 shows the typical architecture of such a system, and was discussed in detail in the Background of the Invention supra.

The image recognition application code is supplied with one or more reference images for which to search the rasterized video image which is being or to be displayed. The reference images may be stored on the system disk, system memory, or obtained from other system resources such as a local area network ("LAN") interface or Internet connection. The image recognition application code then systematically retrieves all or part of the video image from the video memory through one or more device driver and OS function calls. The image recognition application may store the video image data in system memory which has been allocated to the process by the operating system.

Each pixel's video image data can be represented as a three dimensional vector such as:

$$P_{row,col}=(p_r, p_b, p_g)$$

where $p_r$ is the strength of the red luminance, $p_b$ is the strength of the blue luminance, and $p_g$ is the strength of the green luminance of the pixel located at the row and column position (row, col). For example, in some of the highest resolution VGA systems, the row value ranges from 0 (zero) to 1223, the column value ranges from 0 (zero) to 1279, and each luminance value can range from 0 to FF in hexadecimal notation (0 to 255 in decimal) for 8-bit color resolution.

Figure 2:
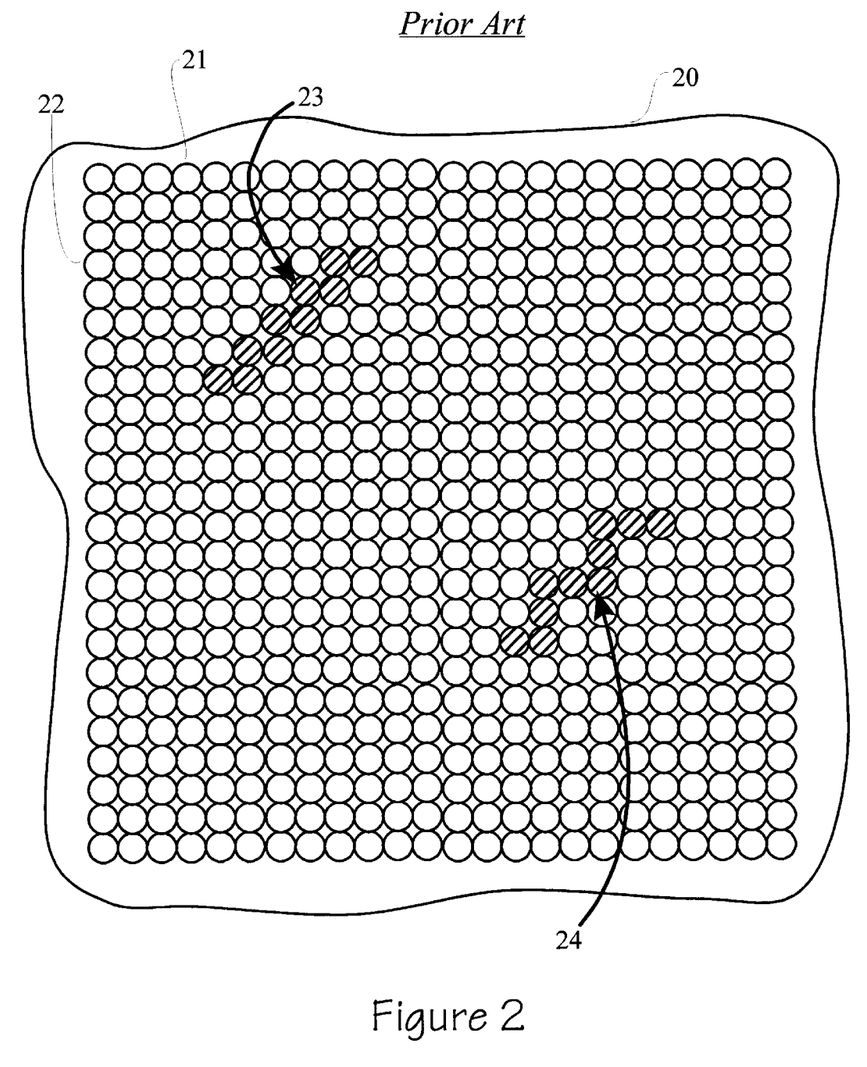
FIG. 2 represents a close view of a section of a rasterized display such as a computer display screen.

FIG. 2 show a portion (20) of a rasterized image display such as a portion of a CRT video screen, in which pixels are organized into rows (22) and columns (21). Two portions of diagonal lines are displayed (23, 24) on the screen as indicated by the pixels with crosshatching which would be illuminated with a different color that those pixels shown without crosshatching. Although both portions of diagonal lines represent equal length and slope line segments (a slope of 5/6), the actual pixels highlighted are different from each other as is commonly the case when two different video graphics accelerators are used to generate the video pattern. Further, the colors of each pixel may be slightly different blends of the RGB values due to differences in the graphic accelerator algorithms.

In an manually analyzed and qualified display, line segment 23 may be the reference image, and line segment 24 may be the feature to be classified as a match or mismatch with the reference image. Image 23 could be a more complex image, such as a computer icon, test pattern, or an outline of a physical object such as a bone pin or bullet. Image 24 may be a portion of an image being displayed, such as a computer screen or a digital X-ray display. Subjectively, a human operator may decide the two images are "equivalent" in color and shape, but this is very time consuming and error-prone as human attentiveness and ability to recognize patterns varies with time and condition of the human operator. Further, the subjective level of "equivalent" may cause variations in the image analysis from one operator to another.

Figure 3:
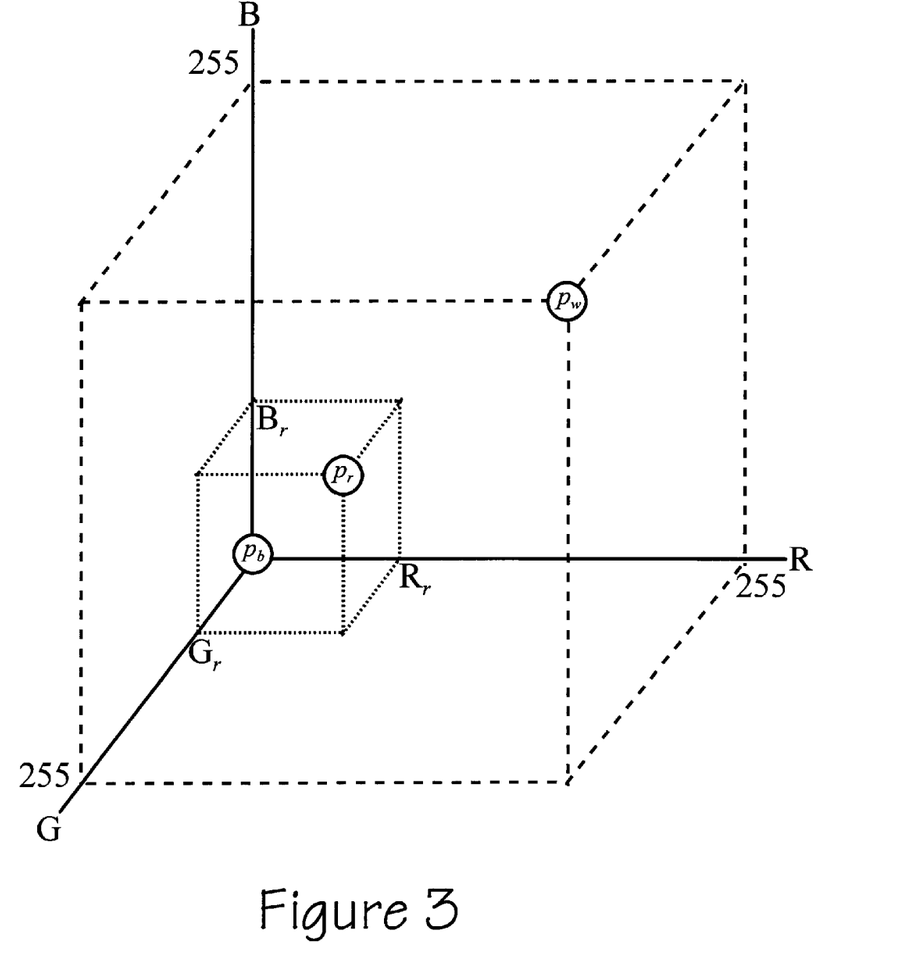
FIG. 3 contains a representation of the color data for display pixels as a three-dimensional Cartesian plot to visually illustrate the basis for the method of the invention.

In the method and system of the invention, each pixel is treated as a point in three dimensional space as shown in FIG. 3, using the luminance values for red, green and blue as the three axis. In an 8-bit color system, a pure white pixel $p_w$ would be represented by a plot at the far extreme of the cube where all three luminance values are equal to 255 decimal. Likewise, a purely black pixel $p_b$ would be represented by a plot at the origin of the graph where all three luminance values are equal to 0 (zero). All points within the cube defined in FIG. 2 represent all pixel colors, shades, and brightness levels available on the 8-bit color system. Therefore, each reference pixel $p_r$ of the reference image can be plotted within the cube shown.

Figure 4A:
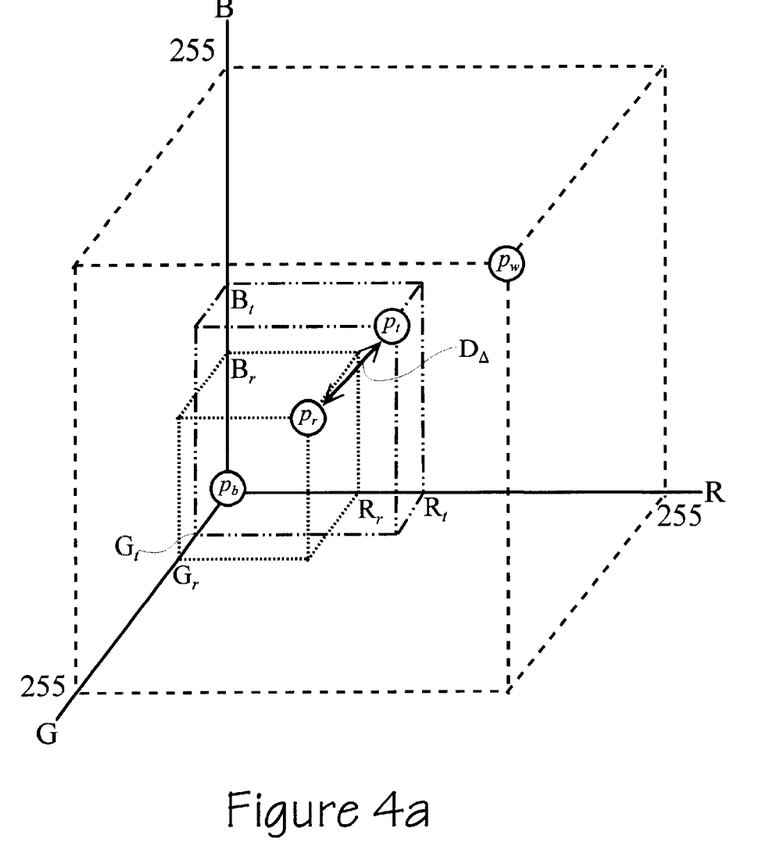
FIG. 4*a* graphically illustrates the relationship between a reference color pixel data values and the values of a color pixel under test.

For the first step of the method, an exact pixel-by-pixel match is sought in the image under analysis. So, for each column and row position in the reference image, the variation in color from the pixel in the same row and column position in the image under analysis is determined. FIG. 4*a* shows the two pixels, $p_r$ and $p_t$ plotted in the same three-dimensional graph. The difference in colors of the two pixels is viewed as the distance DΔ between the two points as given by the formula:

$$D_\Delta = \text{Square Root}(R_\Delta^2 + G_\Delta^2 + B_\Delta^2)$$

where $R_{66}$ is the difference between the red luminance of the reference pixel and the pixel under test, $G_\Delta$ is the difference between the green luminance of the reference pixel and the pixel under test, and $B_\Delta$ is the difference between the blue luminance of the reference pixel and the pixel under test, allowing the formula to be expanded to:

$$\begin{aligned}D_\Delta &= \text{Square Root}(R_\Delta^2 + G_\Delta^2 + B_\Delta^2) \\ &= \text{Square Root}\{(R_t - R_R)^2 + (G_t - G_r)^2 + (B_t - B_r)^2\}\end{aligned}$$

Figure 4B:
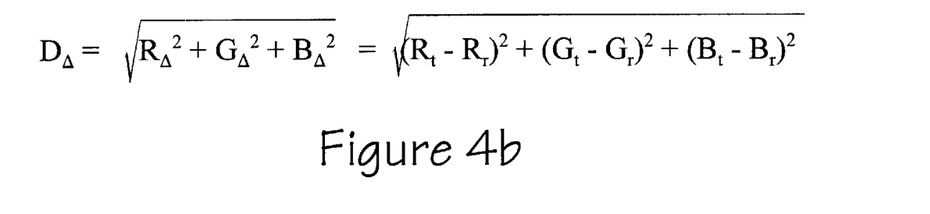
FIG. 4*b* shows a formula for calculating the degree of match or mismatch of the colors of the pixels.

This formula is reproduced as FIG. 4*b* for convenience when reviewing FIG. 4*a*. This nontraditional view and representation of the pixel color data gives rise to this algebraic formula which is realizable efficiently in software, such as "C", or programmable logic, such as Very-High Level Design language ("VHDL").

The first step of the method then systematically directly compares each pixel of the reference image to each corresponding pixel of the image under test. If the difference in color of the pixels is below an adjustable threshold $D_{\Delta,max}$, the pixels are considered a match and analysis increments to the next pixel pair of the two images. Viewed graphically in the three dimensional Cartesian graph, any pixel which falls on or within a sphere of radius $D_{\Delta,max}$ centered about point $p_r$ is considered a match. Increasing the value of $D_{\Delta,max}$ allows more variation of images to be qualified as a match, possibly lowering the accuracy of the method. Likewise, decreasing the value of $D_{\Delta,max}$ requires a closer match to be found, possibly increasing the accuracy of the method.

Figure 5:
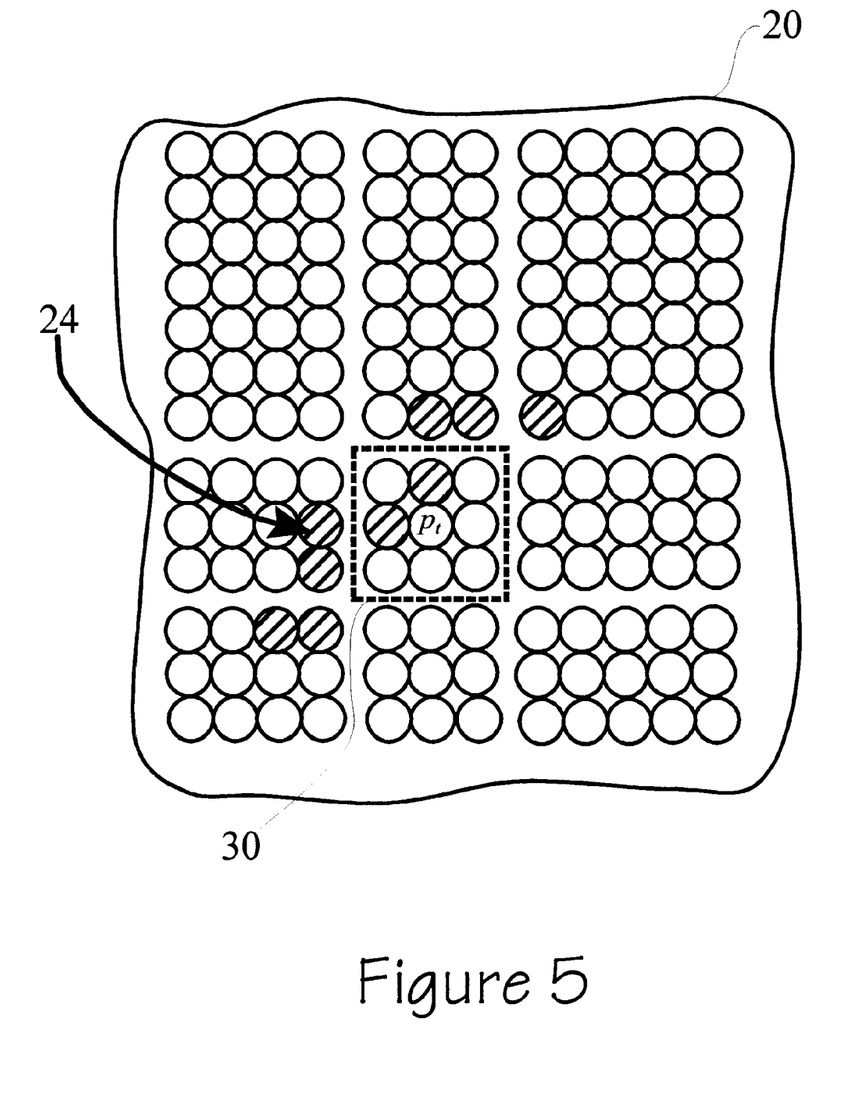
FIG. 5 sets forth a visual representation of the regional pixel analysis employed by the invention as viewed in a section of a rasterized display such as a computer display screen.

If the direct pixel-to-pixel comparison does not yield a match in the same exact position, a pseudo-match may be possible due to differences in the graphical representations of the two images, as was illustrated in FIG. 2. Therefore, the second step of the method searches the immediate area of the pixel under test for matches. FIG. 5 shows a 1-pixel area (30) to be searched around the pixel under test $p_t$, which yields a 3-pixel by 3-pixel square area to be qualified. For each pixel within the search area, the color match analysis method of the first step is used while searching for direct pixel-to-pixel matches between the pixels in the area in the image under analysis and the pixels in the area of the reference image. For example, if the area around $p_{t(219,524)}$ were being searched, the following pixel pairs would be analyzed:

$p_{t(218,523)}$ to $p_{r(218,523)}$, $p_{t(219,523)}$ to $p_{r(219,523)}$, $p_{t(220,523)}$ to $p_{r(220,523)}$, $p_{t(218,524)}$ to $p_{r(218,524)}$, $p_{t(220,524)}$ to $p_{r(220,524)}$, $p_{t(218,525)}$ to $p_{r(218,525)}$, $p_{t(219,525)}$ to $p_{r(219,525)}$, and $p_{t(220,525)}$ to $p_{r(220,525)}$.

A pseudo-match is declared to exist for pixel $p_{t(219,524)}$ when a minimum number of regional matches are found. This number is preferably implemented as an adjustable value, such as a variable in software, to allow the pseudo-match criteria to be tightened or loosened appropriately according to the application of the invention.

In the preferred embodiment, the final step of the method is to determine the total number of matches and pseudo-matches. For testing video adapter cards, a requirement of 100% matches or pseudo-matches has been found to be useful. The adjustable minimum number of regional matches necessary to declare a pseudo-match is the single degree of freedom necessary to allow the method to be varied to meet different performance levels of a variety of video graphics accelerators and adapter boards. However, the requirement for 100% of the pixels to have a match or pseudo-match could also be implemented as a variable to allow a second degree of freedom which may be useful for other applications of the method.

In an enhanced version of the invention, the reference image may be marked in the test image by the operator and then used to find duplicates within the test image. For example, a manufacturing test technical qualifying a new video display adapter could first display an image using a known-acceptable video adapter card, select an area of the display to use as a reference (such as an icon or portion of a test pattern), store that portion of the image as a reference image, and then perform the analysis on an image generated by the video adapter under test.

In the preferred embodiment, the pseudocode shown in TABLE 1 is implemented using "C" running under the IBM OS/2 operating system on a IBM-compatible personal computer hardware platform with a VGA video driver card. TABLE 2 presents the pseudocode for the area analysis, which is similar in structure and logic to the pseudocode shown in TABLE 1.

TABLE 1

Method Pseudocode

```
START:
matches_and_psmatches = 0 /* initialize match and pseudo-match count */
delta_row = 1 /* initialize row dimension of area allowed for pseudo-match */
delta_col = 1 /* initialize column dimension of area allowed for psmatch */
/* Outer loop processes entire X by Y pixel image */
For row = 0 to (X-1)
    For column = 0 to (Y-1)
        If color match for p_t(row,col) is found at p_r(row,col) then
```

TABLE 1-continued

Method Pseudocode

```
            matches_and_psmatches += 1
        else If check_area(delta_row,row,delta_col,col) = TRUE then
            matches_and_psmatches += 1
        endif
    endif
    next column
next row
/* Determine if entire image matches */
If (matches_and_psmatches = (X * Y) ) then
    Image Matches     /* print, log or other action */
else Image Mismatches      /* print, log or other action */
endif
END
```

In TABLE 2, the subroutine pseudocode referred to in TABLE 1 is given. The logical structure of the subroutine is very similar to that of TABLE 1, lending the entire code implementation to ease of a single module design which could be re-entrant so that no actual subroutine is necessary. Alternatively, the logic of TABLE 2 could be included in the logic of TABLE 1 without a subroutine or function call.

TABLE 2

SUBROUTINE check_area(delta_row,row,delta_col,col) Pseudocode

```
START
min_area_score = 0.79 /* initialize image score */
psmatches=0              /* initialize area match count */
/* Outer loop processes entire 2*delta_row by 2*delta_col area around pixel */
For area_row = (row - delta_row) to (row + delta_row)
    For area_col = (col - delta_col) to (col + delta_col)
        If color match for p_r(area_row,area_col) is found
            at p_t(area_row,area_col) then
            psmatches += 1
        endif
    next area_col
next area_row
/* Determine if area matches */
If (psmatches / ( (2*delta_row+1) * (2*deta_col+1) )>min_area_score)
then
    Area Matches        /* set return parameter to TRUE */
else Area Mismatches    /* set return parameter to FALSE */
endif
END
```

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method in a computer system for detecting a match between a two digital multiple-pixel image data sets in computer-readable media, each pixel having a row position value, a column position value, and a color luminance data set, comprising the steps of:

comparing pixel luminance data sets for corresponding pixel pairs between the multiple-pixel image data sets for which the row and column values of the corresponding pixels are equal value;

incrementing an direct pixel match count for every corresponding pixel pair which have pixel luminance data sets within acceptable variation from each other;

comparing a plurality pixel luminance data sets for corresponding pixels in a surrounding area around each corresponding pixel pair for which no direct pixel match was found and incrementing a pseudo-match counter for each area in which a minimum number of corresponding pixel matches are found; and determining that the digital image data sets match if said image match count combined with said pseudo-match count is equal to or exceeds a minimum value.

2. The method of claim 1 wherein said color luminance data sets of said image data sets further comprise for each pixel a value for red luminance, a value for blue luminance, and a value for green luminance, and wherein said acceptable variation from a reference pixel determination comprises the steps:

determining a red luminance difference value by subtracting the red luminance value of an image pixel from the red luminance value of the corresponding image pixel;

determining a green luminance difference value by subtracting the green luminance value of an image pixel from the green luminance value of the corresponding image pixel;

determining a blue luminance difference value by subtracting the blue luminance value of an image pixel from the blue luminance value of the corresponding image pixel;

summing the squares of the red luminance difference value, the green luminance difference value and the blue luminance difference value;

determining the square root of the sum of the squares of the difference values; and determining that luminance data sets falls within an acceptable variation to each other if said square root value is less than or equal to a predetermined maximum variation value.

3. The method of claim 1 further comprising the step of retrieving at least one of the digital image data sets from a video memory of a computer display video adapter card.

4. A computer-readable medium containing instructions for detecting correct display of a digital image on a portion of a video display, by:

retrieving from a first computer-readable media a portion of a first digital image to be analyzed, said portion of a digital image comprising a data set for multiple image pixels, each image pixel being represented by a row position value, a column position value, and a color luminance data set;

retrieving from a second computer-readable media a second digital image to be used as a reference image, said second digital image comprising a data set for multiple image pixels, each image pixel being represented by a row position value, a column position value, and a color luminance data set;

comparing a plurality of pixels in a surrounding area around each pixel of the reference image for which no match was found, and incrementing a pseudo-match counter for each region in which a minimum number of corresponding pixel matches are found; and determining that the portion of the first digital image matches said reference image if said image match count combined with said pseudo-match count is equal to or exceeds a minimum value.

5. The computer-readable medium of claim 4 wherein said luminance data sets further comprise a value for red luminance, a value for blue luminance, and a value for green luminance, and wherein said acceptable variation from a reference pixel determination comprises the steps:

determining a red luminance difference value by subtracting the red luminance value of the reference image pixel from the red luminance value of the first image pixel, determining a green luminance difference value by subtracting the green luminance value of the reference image pixel from the green luminance value of the first image pixel, determining a blue luminance difference value by subtracting the blue luminance value of the reference image pixel from the blue luminance value of the first image pixel, summing the squares of the red luminance difference value, the green luminance difference value and the blue luminance difference value;

determining the square root of the sum of the squares of the difference values; and determining that a first image pixel luminance data set falls within an acceptable variation from a reference image pixel data set if said square root is less than or equal to a predetermined value.

6. The computer-readable medium of claim 4 wherein said first computer-readable media is video memory of a computer display video adapter card.

7. An apparatus for testing a video display adapter that controls a video display, the apparatus comprising:

a reference image command means for causing the video display adapter to generate a facsimile of a reference image on a video display; and an image comparison means for comparing the reference image with the contents of a video memory employed by the video display adapter, said image comparison means having a output for indicating the results of the comparison as a match or a mismatch, and being configured to perform the steps of:

comparing pixel luminance data sets for corresponding pixel pairs between multiple-pixel image data sets for which the row and column values of the corresponding pixels are equal value;

incrementing a direct pixel match count for every corresponding pixel pair which have pixel luminance data sets within acceptable variation from each other;

comparing a plurality pixel luminance data sets for corresponding pixels in a surrounding area around each corresponding pixel pair for which no direct pixel match was found and incrementing a pseudo-match counter for each area in which a minimum number of corresponding pixel matches are found; and determining that the digital image data sets match if said image match count combined with said pseudo-match count is equal to or exceeds a minimum value.

8. The apparatus of claim 7 wherein said reference image is a vector graphics generation command.

9. The apparatus of claim 7 wherein said reference image is a bitmap image display command.

10. The apparatus of claim 7 wherein said video memory contents comprise a data set for a plurality of pixels to be displayed on the video display.

11. The apparatus of claim 10 wherein said video memory contents further comprise color luminance data sets for each of the plurality of pixels.

12. The apparatus of claim 11 wherein said image comparison means further comprises a comparison means for each pixel of said reference image to each pixel of said video memory contents.

13. The apparatus of claim 12 wherein said image comparison means further comprises a means for determining a deviation of the color luminance data set for each pixel of said video memory contents from the color luminance data set for each pixel of said reference image using a square-root of the sum of the squares of the differences rule.

14. The apparatus of claim 12 wherein said image comparison means further comprises a means for determining for a plurality of pixels of said video memory contents a deviation of the color luminance data set from the color luminance data set for each pixel of said reference image using a square-root of the sum of the squares of the differences rule, said plurality of pixels of the video memory contents representing a contiguous regional portion of said video memory contents surrounding a given pixel location.

* * * * *

UNITED STATES PATENT AND TRADEMARK OFFICE
CERTIFICATE OF CORRECTION

PATENT NO.     : 6,591,010 B1
DATED          : July 8, 2003
INVENTOR(S)    : Russin It is certified that error appears in the above-identified patent and that said Letters Patent is hereby corrected as shown below:

<u>Title page,</u>
Item [74], *Attorney, Agent or Firm*, reads "Mima, Jr." should read -- Mims, Jr. --

Signed and Sealed this

Second Day of March, 2004

JON W. DUDAS
*Acting Director of the United States Patent and Trademark Office*